(No Model.)

A. L. ROWLING.
MILK STRAINER.

No. 605,829. Patented June 14, 1898.

Witnesses:
Chas. E. Gaylord.
Lute J. Alter

Inventor:
Arthur L. Rowling,
By Banning & Banning & Sheridan
Attys.

UNITED STATES PATENT OFFICE.

ARTHUR L. ROWLING, OF WAUKEGAN, ILLINOIS.

MILK-STRAINER.

SPECIFICATION forming part of Letters Patent No. 605,829, dated June 14, 1898.

Application filed February 23, 1897. Serial No. 624,510. (No model.)

*To all whom it may concern:*

Be it known that I, ARTHUR L. ROWLING, a citizen of the United States, residing at Waukegan, Illinois, have invented certain new and useful Improvements in Milk-Strainers, of which the following is a specification.

The object of my invention is to make a milk-strainer in which the sediment, impurities, and foreign substances will be prevented from passing into the can into which the milk is strained and in which such sediment, impurities, and foreign substances may be easily and readily caught and removed from the strainer; and my invention consists in the features and details of construction hereinafter described and claimed.

Figure 1:
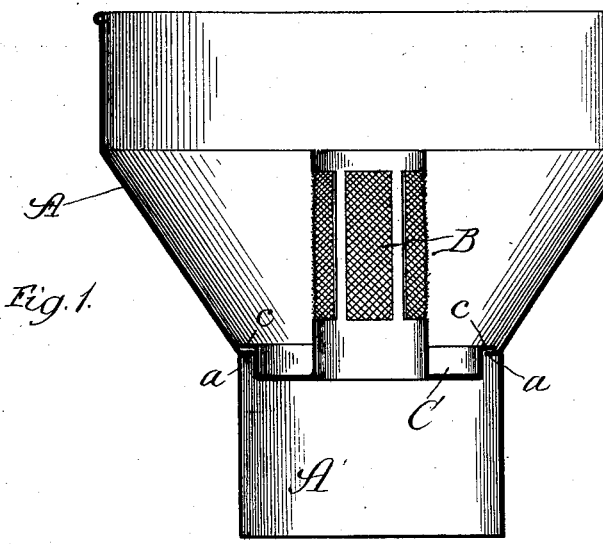
Figure 2:
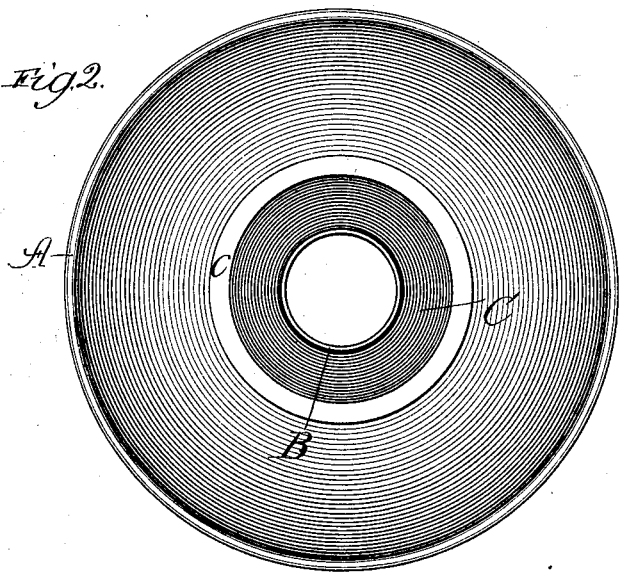

In the drawings, Figure 1 is a vertical sectional elevation of a milk-strainer with my improvements, and Fig. 2 a plan view of the same.

In making my improved milk-strainer I make a funnel A with an extension A', adapted to enter the mouth of a milk-can, such as those in which milk is shipped to the market. This extension may be provided with an annular ledge $a$ around its interior surface. I make a vertical strainer B, having a cup C, which may be provided with an annular lip $c$, adapted to rest on the ledge $a$. The interior of this cup extends down a desired distance below the lip, and the perforated portion of the strainer or the straining-cloth ends at some distance above the bottom of the cup, as illustrated in the drawings. The strainer, with its attached cup, is adapted to be lifted out or put in at pleasure. When milk is poured into the funnel from the buckets in which it is milked, the sediment, impurities, and foreign substances that may be in it are caught in the cup and are prevented from passing through into the milk-can. After the straining is completed the strainer with its cup, in which the sediment and foreign substances have been caught, can be lifted out and washed or otherwise cleaned. In this way not only is the sediment and foreign substances prevented from passing into the milk-can, but they are also caught and easily removed.

Of course the lip $c$ of the cup, instead of resting upon the annular ledge $a$, could be made of a size to rest against the flaring portion of the funnel, if preferred, so as to hold it in place.

What I regard as new, and desire to secure by Letters Patent, is—

1. The combination of a funnel and of a strainer provided with a cup arranged below the perforated portion of the strainer having an annular lip resting against the funnel when in use.

2. The combination of a funnel provided with an interior annular ledge and a strainer having a cup arranged below the perforated portion of the strainer and provided with an annular lip resting on the annular ledge when in use.

ARTHUR L. ROWLING.

Witnesses:
THOMAS A. BANNING,
THOMAS B. MCGREGOR.